(12) United States Patent
Lippie

(10) Patent No.: US 7,712,263 B1
(45) Date of Patent: May 11, 2010

(54) BIRD REPELLANT DEVICE

(76) Inventor: Randall Lippie, 5105 E. Los Angeles Ave., #97, Simi Valley, CA (US) 93063

( * ) Notice: Subject to any disclaimer, the term of this patent is extended or adjusted under 35 U.S.C. 154(b) by 467 days.

(21) Appl. No.: 10/903,135

(22) Filed: Aug. 2, 2004

(51) Int. Cl.
*E04B 1/72* (2006.01)
(52) U.S. Cl. ....................................................... 52/101
(58) Field of Classification Search .................... 52/57,
52/60, 101, 102, 604, 24–26, 97, 58, 84,
52/717.05, 717.06, 716.1, 287.1, 288.1, 209,
52/235, 730.1, 204.54; 47/9, 33, 25, 32;
119/713, 903, 61, 64; 43/1, 107, 112, 121,
43/124; 256/3, 4, 11; D22/119; 40/745
See application file for complete search history.

(56) References Cited

U.S. PATENT DOCUMENTS

| | | | | |
|---|---|---|---|---|
| 2,149,742 A | * | 3/1939 | Miller | 52/717.03 |
| 2,541,768 A | * | 2/1951 | Keller | 52/287.1 |
| 2,922,385 A | * | 1/1960 | Murray | 52/94 |
| 4,091,586 A | * | 5/1978 | Schwartz | 52/287.1 |
| 4,242,817 A | * | 1/1981 | Ballard | 40/745 |
| 4,261,123 A | * | 4/1981 | Mariotti | 40/791 |
| 4,269,008 A | | 5/1981 | Assouline | |
| 4,359,844 A | | 11/1982 | Hoggard et al. | |
| 4,601,149 A | * | 7/1986 | Dokan | 52/287.1 |
| 4,709,522 A | * | 12/1987 | Carnahan | 52/288.1 |
| 4,773,173 A | * | 9/1988 | Christian | 40/754 |
| 4,962,619 A | | 10/1990 | Chatten | |
| 4,982,457 A | * | 1/1991 | Donaton | 4/504 |
| 5,058,335 A | | 10/1991 | Richter | |
| 5,303,523 A | * | 4/1994 | Hand et al. | 52/101 |
| 5,367,842 A | * | 11/1994 | Janesky | 52/169.5 |
| 5,400,552 A | | 3/1995 | Negre | |
| D357,771 S | | 4/1995 | Townsend, III et al. | |
| D370,355 S | * | 6/1996 | Kenney | D6/314 |
| 5,606,830 A | | 3/1997 | Townsend, Jr. et al. | |
| 5,713,160 A | | 2/1998 | Heron | |
| 5,864,096 A | | 1/1999 | Williams et al. | |

(Continued)

FOREIGN PATENT DOCUMENTS

GB        2020179 A    * 11/1979

(Continued)

OTHER PUBLICATIONS

Supplemental Information Disclosure Statement, Circumstances Surrounding Development of Bird Repellant Device.

(Continued)

*Primary Examiner*—Robert J Canfield
*Assistant Examiner*—Christine T Cajilig
(74) *Attorney, Agent, or Firm*—Knobbe, Martens, Olson & Bear, LLP

(57) ABSTRACT

An improved bird repellent device which is simple and inexpensive to produce and install, yet which is 100% effective in preventing birds from landing or nesting on the protected structure by presenting a surface which projects outwardly from the protected structure at an angle in excess of 25° is impossible for birds to land or nest on and which can be installed quickly and easily on substantially any structure to be protected and is 100% effective in preventing landing or nesting or birds.

5 Claims, 2 Drawing Sheets

U.S. PATENT DOCUMENTS

| | | | |
|---|---|---|---|
| 5,913,780 A | | 6/1999 | Goergen |
| 5,916,095 A | * | 6/1999 | Tamlyn .......................... 52/58 |
| 5,926,999 A | * | 7/1999 | Vernon et al. .................. 43/121 |
| 6,003,471 A | | 12/1999 | Ohba |
| 6,115,982 A | * | 9/2000 | Lindenberg .............. 52/506.05 |
| 6,176,047 B1 | | 1/2001 | Morningstar |
| 6,237,293 B1 | * | 5/2001 | Gembala ................... 52/302.6 |
| 6,243,995 B1 | * | 6/2001 | Reeves et al. ................... 52/94 |
| 6,250,023 B1 | | 6/2001 | Donoho |
| 6,283,064 B1 | | 9/2001 | Djukastein et al. |
| 6,298,609 B1 | * | 10/2001 | Bifano et al. .................... 52/58 |
| D450,855 S | * | 11/2001 | Schlichting et al. .......... D25/38 |
| D451,204 S | * | 11/2001 | Schlichting et al. .......... D25/38 |
| 6,314,688 B1 | | 11/2001 | Ford et al. |
| 6,385,932 B1 | * | 5/2002 | Melchiori ................... 52/302.3 |
| 6,415,559 B1 | * | 7/2002 | Reeves et al. ................... 52/94 |
| 6,421,971 B1 | * | 7/2002 | Gembala ................... 52/302.6 |
| 6,457,283 B1 | | 10/2002 | Jensen |
| 6,477,977 B1 | | 11/2002 | Combes |
| 6,591,575 B2 | * | 7/2003 | Benedettini ................ 52/716.1 |
| 6,625,925 B1 | * | 9/2003 | Foster ............................ 47/33 |
| 6,718,701 B2 | | 4/2004 | Riddell |
| 6,725,620 B2 | * | 4/2004 | Dai ........................ 52/717.01 |
| 6,931,798 B1 | * | 8/2005 | Pocai ........................... 52/102 |
| 6,941,706 B2 | * | 9/2005 | Austin et al. .................... 52/94 |
| 6,996,938 B1 | * | 2/2006 | Mullane ......................... 52/24 |
| 7,040,058 B2 | * | 5/2006 | Finkelstein .................. 52/101 |
| 7,051,477 B2 | * | 5/2006 | Burnham ........................ 47/33 |
| 2001/0017012 A1 | * | 8/2001 | Wiesener et al. .............. 52/101 |
| 2003/0093970 A1 | | 5/2003 | Jensen ....................... 52/716.1 |
| 2004/0194423 A1 | * | 10/2004 | Payne ........................ 52/741.1 |
| 2006/0207195 A1 | * | 9/2006 | Donoho ........................ 52/101 |

FOREIGN PATENT DOCUMENTS

| | | |
|---|---|---|
| JP | 06-284848 | 10/1994 |
| JP | 2004-308251 | * 11/2004 |

OTHER PUBLICATIONS

Invoice Dated More Than One Year Prior to Critical Date.
Photograph of Bird Repellant Device Installed More Than One Year Prior to Critical Date.
Video referenced in Supplemental IDS dated Feb. 7, 2008, taken more than one year prior to critical date (Exhibit 1 of 5 from Submission of Exhibits Specifically Required Under 37 C.F.R. § 1.91).
Video referenced in Supplemental IDS dated Feb. 7, 2008, taken more than one year prior to critical date (Exhibit 2 of 5 from Submission of Exhibits Specifically Required Under 37 C.F.R. § 1.91).
Video referenced in Supplemental IDS dated Feb. 7, 2008, taken more than one year prior to critical date (Exhibit 3 of 5 from Submission of Exhibits Specifically Required Under 37 C.F.R. § 1.91).
Video referenced in Supplemental IDS dated Feb. 7, 2008, taken more than one year prior to critical date (Exhibit 4 of 5 from Submission of Exhibits Specifically Required Under 37 C.F.R. § 1.91).
Video referenced in Supplemental IDS dated Feb. 7, 2008, taken more than one year prior to critical date (Exhibit 5 of 5 from Submission of Exhibits Specifically Required Under 37 C.F.R. § 1.91).
Still Photograph taken from video referenced in Supplemental IDS dated Feb. 7, 2008, taken more than one year prior to critical date (1/14).
Still Photograph taken from video referenced in Supplemental IDS dated Feb. 7, 2008, taken more than one year prior to critical date (2/14).
Still Photograph taken from video referenced in Supplemental IDS dated Feb. 7, 2008, taken more than one year prior to critical date (3/14).
Still Photograph taken from video referenced in Supplemental IDS dated Feb. 7, 2008, taken more than one year prior to critical date (4/14).
Still Photograph taken from video referenced in Supplemental IDS dated Feb. 7, 2008, taken more than one year prior to critical date (5/14).
Still Photograph taken from video referenced in Supplemental IDS dated Feb. 7, 2008, taken more than one year prior to critical date (6/14).
Still Photograph taken from video referenced in Supplemental IDS dated Feb. 7, 2008, taken more than one year prior to critical date (7/14).
Still Photograph taken from video referenced in Supplemental IDS dated Feb. 7, 2008, taken more than one year prior to critical date (8/14).
Still Photograph taken from video referenced in Supplemental IDS dated Feb. 7, 2008, taken more than one year prior to critical date (9/14).
Still Photograph taken from video referenced in Supplemental IDS dated Feb. 7, 2008, taken more than one year prior to critical date (10/14).
Still Photograph taken from video referenced in Supplemental IDS dated Feb. 7, 2008, taken more than one year prior to critical date (11/14).
Still Photograph taken from video referenced in Supplemental IDS dated Feb. 7, 2008, taken more than one year prior to critical date (12/14).
Still Photograph taken from video referenced in Supplemental IDS dated Feb. 7, 2008, taken more than one year prior to critical date (13/14).
Still Photograph taken from video referenced in Supplemental IDS dated Feb. 7, 2008, taken more than one year prior to critical date (14/14).

* cited by examiner

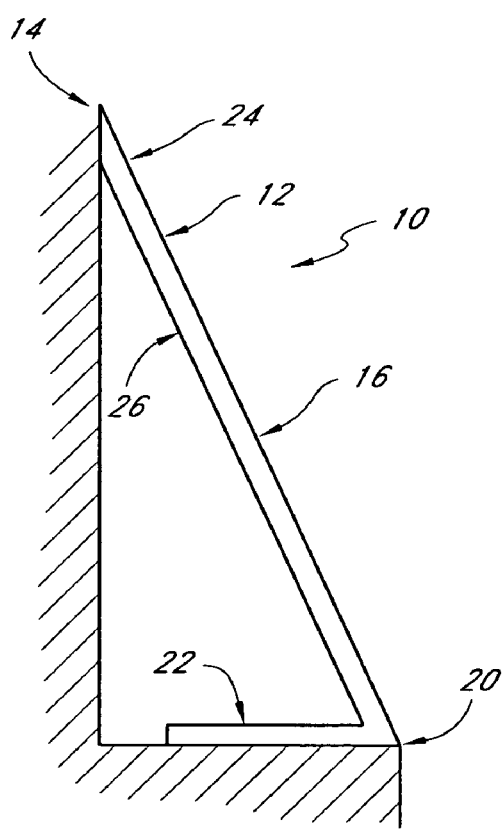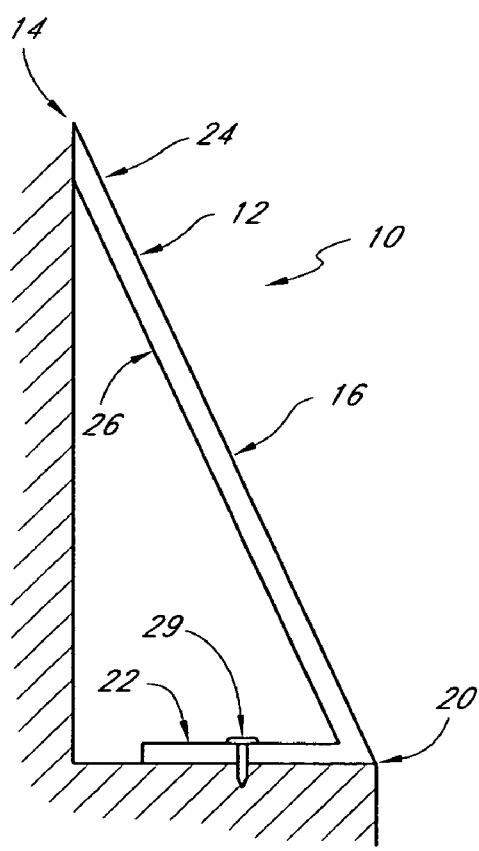
FIG. 2A                    FIG. 2B

BIRD REPELLANT DEVICE

FIELD OF INVENTION

This invention relates to bird repellants and is particularly directed to improved apparatus for preventing birds from landing or nesting on billboards, buildings and the like.

PRIOR ART

Birds often land on billboards, buildings and the like and leave droppings which are unsightly and mar or obscure the appearance of the sign or building. Furthermore, such droppings entail considerable time and expense to remove and may cause permanent stains. Also, birds often build nests and raise young birds which greatly increases the problem of droppings plus the added problem of removing the unsightly nests. Numerous types of chemical bird deterrents have been proposed heretofore, however, these are usually of little or no effect. Also, several types of mechanical devices have been proposed to prevent birds from landing or nesting. Some of these have involved rotating arms which sweep about the edge of the billboard or roof so that approaching birds will be unable to land without being hit. However, these rotating devices require energy for operation which causes a considerable expense to the owner whether or not birds are present. Some stationary bird repellent devices have been proposed which provide a plurality of upwardly extending spikes which are intended to prevent birds from landing or nesting on a protected structure. Unfortunately, many birds still attempt to land on such devices with the result that often the devices are ineffective or serve to wound the birds causing bleeding which only adds to the unsightliness of the problem. Thus, none of the prior art bird repellant devices have been entirely satisfactory.

BRIEF SUMMARY AND OBJECTS OF INVENTION

These disadvantages of the prior art are overcome with the present invention and a bird repellent device is provided which is simple and inexpensive to produce and install and which uses no energy and, hence, has no ongoing expense, yet which is 100% effective in preventing birds from landing or nesting on a protected structure.

These advantages of the present invention are preferably attained by providing an improved bird repellent device which presents a surface which projects outwardly from the protected structure at an angle in excess of 25° which is impossible for birds to land or nest on and which can be installed quickly and easily on substantially any structure to be protected and is 100% effective in preventing landing or nesting or birds.

Accordingly, it is an object of the present invention to provide an improved bird repellent.

Another object of the present invention is to provide an improved bird repellent device.

A further object of the present invention is to provide an improved bird repellent device which is simple and inexpensive to produce and install.

An additional object of the present invention is to provide an improved bird repellent device which is simple and inexpensive to produce and install, yet which is 100% effective in preventing birds from landing or nesting on the protected structure.

A further object of the present invention is to provide an improved bird repellent device which is simple and inexpensive to produce and install, yet which is 100% effective in preventing birds from landing or nesting on the protected structure by presenting a surface which is impossible for birds to land or nest on and which can be installed quickly and easily on substantially any structure to be protected and is 100% effective in preventing landing or nesting or birds.

A specific object of the present invention is to provide an improved bird repellent device which is simple and inexpensive to produce and install, yet which is 100% effective in preventing birds from landing or nesting on the protected structure by presenting a surface which projects outwardly from the protected structure at an angle in excess of 25° is impossible for birds to land or nest on and which can be installed quickly and easily on substantially any structure to be protected and is 100% effective in preventing landing or nesting or birds.

These and other objects and features of the present invention will be apparent from the following detailed description, taken with reference to the figures of the accompanying drawing.

BRIEF DESCRIPTION OF THE DRAWING

FIG. 2A is a side view of the bird repellant device of FIG. 2 as mounted on a protected surface;

FIG. 2B is a side view of an alternative form of the device of FIG. 2A; and

DETAILED DESCRIPTION OF THE INVENTION

Figure 1:
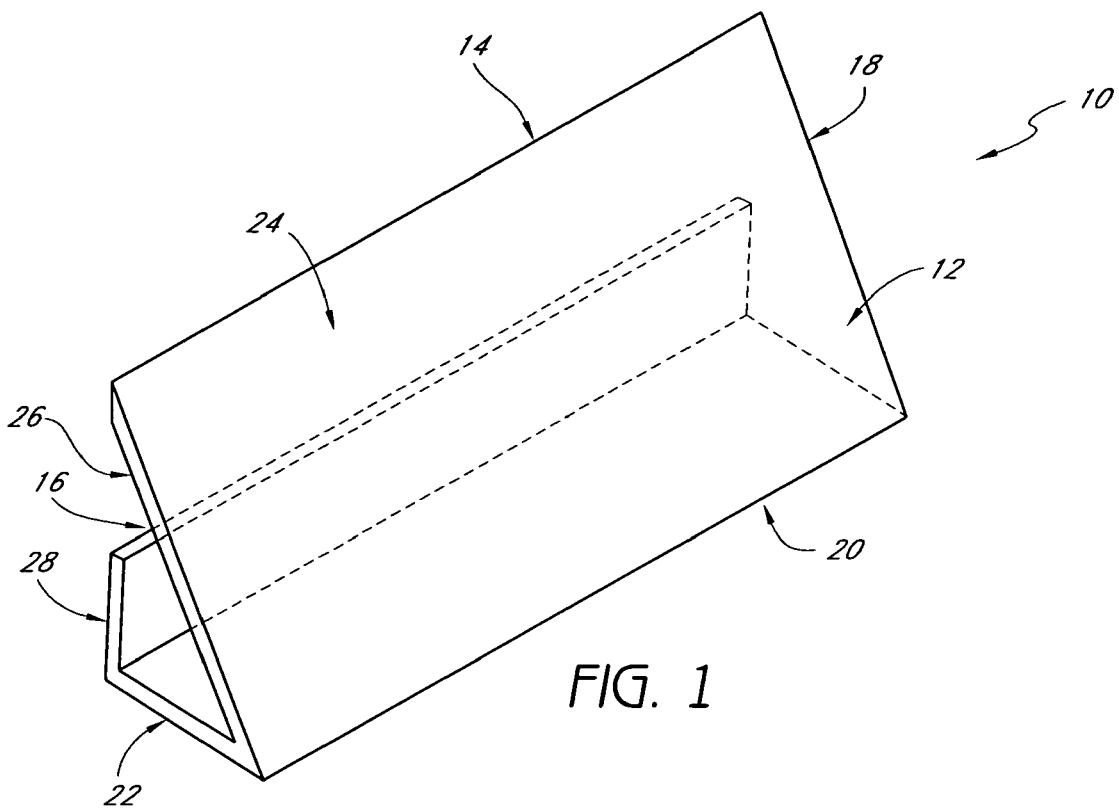
FIG. 1 is an isometric view of a bird repellent device embodying the present invention.

In that form of the present invention chosen for purposes of illustration, FIG. 1 shows a bird repellant device, indicated generally at 10, having a generally rectangular panel 12 having an upper edge 14, two sides 16 and 18 and a straight lower edge 20, with at least one mounting strip 22 attached to the panel 12 and extending parallel to the lower edge 20. The upper edge 14 may be straight, curved, angular, undulating or otherwise shaped, as desired. Moreover, the upper edge 14 may be serrated, notched or otherwise formed to discourage birds from landing thereon. The panel 12 has a front surface 24 and a rear surface 26 and the mounting strip 22 forms an angle of 0°-155° with the front surface 24 of the panel 10. As seen in FIG. 1, the mounting strip 22 may extend rearwardly from the lower edge 20 of the panel 10 and may have a flap 28 extending perpendicularly upward therefrom.

In use, the panel 10 may be mounted on substantially any desired surface to prevent birds from landing on the protected surface. The panel 10 is mounted by securing the mounting strip 22 to the surface to be protected so that the panel 10 lies at an angle of 25°-90° to the horizontal which prevents birds from landing on the panel 10 and, hence, prevents birds from landing or nesting on the protected surface. The mounting strip 22 may be secured to the surface to be protected by driving nails, screws or the like through the mounting strip 22 or, to mount the panel 10 to a vertical surface, by driving nails, screws or the like through flap 28.

Figure 2:
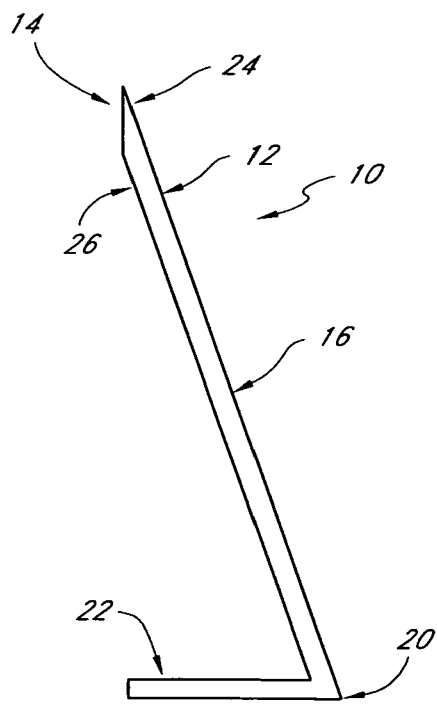
FIG. 2 is a side view of an alternative form of the bird repellant device of FIG. 1.
Figure 3:
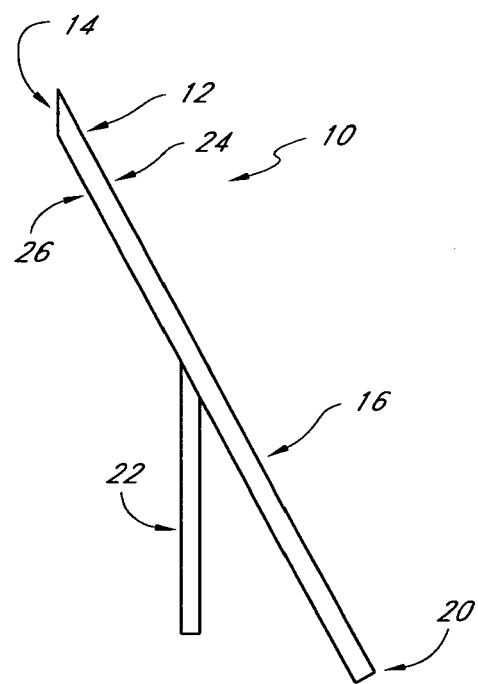
FIG. 3 is a side view of another alternative form of the bird repellant device of FIG. 1.

FIG. 2 shows an alternative form of the device of FIG. 1 wherein the mounting strip 22 is a narrow strip attached to the lower edge 20 of the panel 10. FIG. 2A illustrates the panel 10 of FIG. 2 as mounted on a protected surface. The panel 10 can be installed easily and quickly on substantially any structure so that it is impossible for birds to land or nest thereon. For example, in the example embodiment of FIG. 2B, the narrow mounting strip 22 is secured to the structure with nails. The narrow mounting strip 22 may also be secured with screws and the like. As noted above, the upper edge 14 can be shaped or otherwise formed. Alternatively, FIG. 3 shows the mounting strip 22 attached to the rear surface 26 of the panel 10. In either instance, the mounting strip 22 extends at an angle of 0°-155° with the front surface 24 of panel 10 to enable the panel 10 to be mounted at an angle of 25°-90° to the horizontal.

Obviously, numerous other variations and modifications can be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. A device in combination with a structure for protecting the structure from birds, the combination comprising:
   a horizontal surface formed on said structure to be protected, said horizontal surface having a front and rear edge;
   a first vertical surface extending upwardly from said rear edge of said horizontal surface;
   a second vertical surface extending downwardly from said front edge of said horizontal surface, said horizontal surface and said first and second vertical surfaces forming a ledge to be protected having a ledge width;
   a bird repellant device mounted on said ledge comprising:
   a planar panel having a lower front edge and an upper rear edge, the lower front edge and upper rear edge separated by a horizontal distance comprising a panel span, the upper rear edge of the panel being adjacent the first vertical surface of the structure to be protected, and the lower front edge being adjacent the second vertical surface of the structure to be protected, such that the ledge is completely covered by the panel, the upper rear edge comprising a free edge unconnected to any other structure of the device; and
   a mounting strip having a horizontal width and being mounted to the ledge, wherein the panel adjoins the mounting strip adjacent the lower front edge of the panel, the mounting strip extends horizontally there from, and the panel extends at an angle upwardly from the mounting strip so as to completely cover the ledge, the panel and the mounting strip being substantially V shaped, and
   wherein the panel span is greater than the width of the mounting strip.

2. The combination of claim 1 wherein said mounting strip is mounted by screws or nails.

3. The combination of claim 1, wherein the free edge is shaped or formed.

4. The combination of claim 1, further comprising a vertical leg extending upwardly from the mounting strip.

5. The combination of claim 1, wherein the V shape represents an acute angle of at least 25° from the horizontal.

* * * * *